(12) United States Patent
Dunagan

(10) Patent No.: US 7,387,566 B2
(45) Date of Patent: Jun. 17, 2008

(54) BIG GAME FIELD DRESS KIT

(75) Inventor: Kevin J. Dunagan, 18 Zumbro Ridge Dr., Mantorville, MN (US) 55955

(73) Assignee: Kevin J. Dunagan, Mantorville, MN (US)

( * ) Notice: Subject to any disclaimer, the term of this patent is extended or adjusted under 35 U.S.C. 154(b) by 0 days.

(21) Appl. No.: 11/367,630

(22) Filed: Mar. 2, 2006

(65) Prior Publication Data

US 2007/0254574 A1    Nov. 1, 2007

(51) Int. Cl.
*A22B 5/10* (2006.01)

(52) U.S. Cl. ...................................... 452/102

(58) Field of Classification Search ............... 24/130, 24/133, 134; 52/155–160
See application file for complete search history.

(56) References Cited

U.S. PATENT DOCUMENTS

| | | | |
|---|---|---|---|
| 440,676 A | 11/1890 | Wilder | |
| 2,324,717 A | 7/1943 | Novak | |
| 2,712,864 A * | 7/1955 | Clevett, Jr. ................. | 52/163 |
| 3,484,096 A | 12/1969 | Briggs | |
| 3,635,232 A * | 1/1972 | Rotheiser ................... | 135/118 |
| 3,732,878 A * | 5/1973 | Blankemeyer et al. ...... | 135/118 |
| 3,894,313 A | 7/1975 | Hanger | |
| 4,327,850 A | 5/1982 | Robinson, Jr. | |
| 4,529,240 A | 7/1985 | Engel | |
| 4,699,165 A * | 10/1987 | Barzana ..................... | 135/118 |
| 4,953,576 A * | 9/1990 | Connelly .................... | 135/118 |
| 5,322,386 A * | 6/1994 | Trangsrud ................... | 405/19 |
| 5,360,368 A | 11/1994 | Hajek | |
| 5,407,178 A * | 4/1995 | Long .......................... | 256/45 |
| 5,836,812 A | 11/1998 | Brackett | |
| 5,901,999 A | 5/1999 | Brock | |
| 6,089,636 A | 7/2000 | Harris | |
| 6,251,005 B1 | 6/2001 | Ekes | |
| 6,301,830 B1 * | 10/2001 | Whipple ..................... | 47/43 |
| 6,402,643 B1 * | 6/2002 | Gill ............................ | 473/478 |
| 6,964,277 B2 * | 11/2005 | Naber ........................ | 135/16 |
| 7,192,360 B2 * | 3/2007 | Tamulewicz ................ | 473/162 |

* cited by examiner

*Primary Examiner*—Thomas Price
(74) *Attorney, Agent, or Firm*—Gerald E. Helget; Nelson R. Capes; Briggs and Morgan, P.A.

(57) ABSTRACT

A big game field-dressing kit that permits field-dressing a game animal on the ground and transporting the animal includes several pointed stakes that can be driven into the ground near the animal's head and rear legs. Each of the stakes has a flexible tie such as a rope or cable, and each flexible tie has a loop at the end distal from the stake. One or more of the stakes has notches that can receive the flexible tie after it is passed around the animal's neck, so that the stake acts as a handle for dragging the animal along the ground.

4 Claims, 3 Drawing Sheets

BIG GAME FIELD DRESS KIT

BACKGROUND OF THE INVENTION

Field dressing is the procedure performed by hunters proximate the time of taking a game animal to prevent the contamination and spoiling of the game meat. Typically, field dressing is performed to immediately remove the entrails and the feed from the animal before transporting the meat to a site for final cleaning, refrigeration or cooking.

Field dressing big game such as deer or elk presents greater problems than field dressing small game such as birds. With small game, the carcass can typically be held open by one hand as a knife is used to cut the carcass. However, with big game, it is necessary either to have two persons, one of whom holds open the carcass while the other cuts it; or to provide some way of tensioning the carcass open.

In addition, big game must typically be dragged from the area of the kill to an adjacent area where a vehicle is parked.

There is a need for a big game field dressing kit that addresses the above problems.

SUMMARY OF THE INVENTION

The present invention is a big game field dressing kit for field dressing a game animal on the ground and transporting the game animal, comprising:

(a) a plurality of pointed stakes adapted to be driven into the ground; and (b) a plurality of flexible ties attached to the plurality of stakes and adapted to be affixed to the game animal thereby tensioning the carcass of the game animal for field-dressing;

(c) wherein each of the plurality of flexible ties further comprises a loop at an end distal from the corresponding stake, wherein the loop is attachable to one of the animal's limbs;

(d) wherein at least one of the plurality of stakes has a notch for receiving the loop after the tie is passed around the animal's neck, thereby allowing the animal to be dragged to another location.

A principle object and advantage of the present invention is that the animal can be field-dressed by a single person.

Another principle advantage of the present invention is that it allows the hunter to transport the animal to a separate location by using the same stakes used to tension the animal for field dressing.

DETAILED DESCRIPTION OF THE PREFERRED EMBODIMENT

Figure 1:
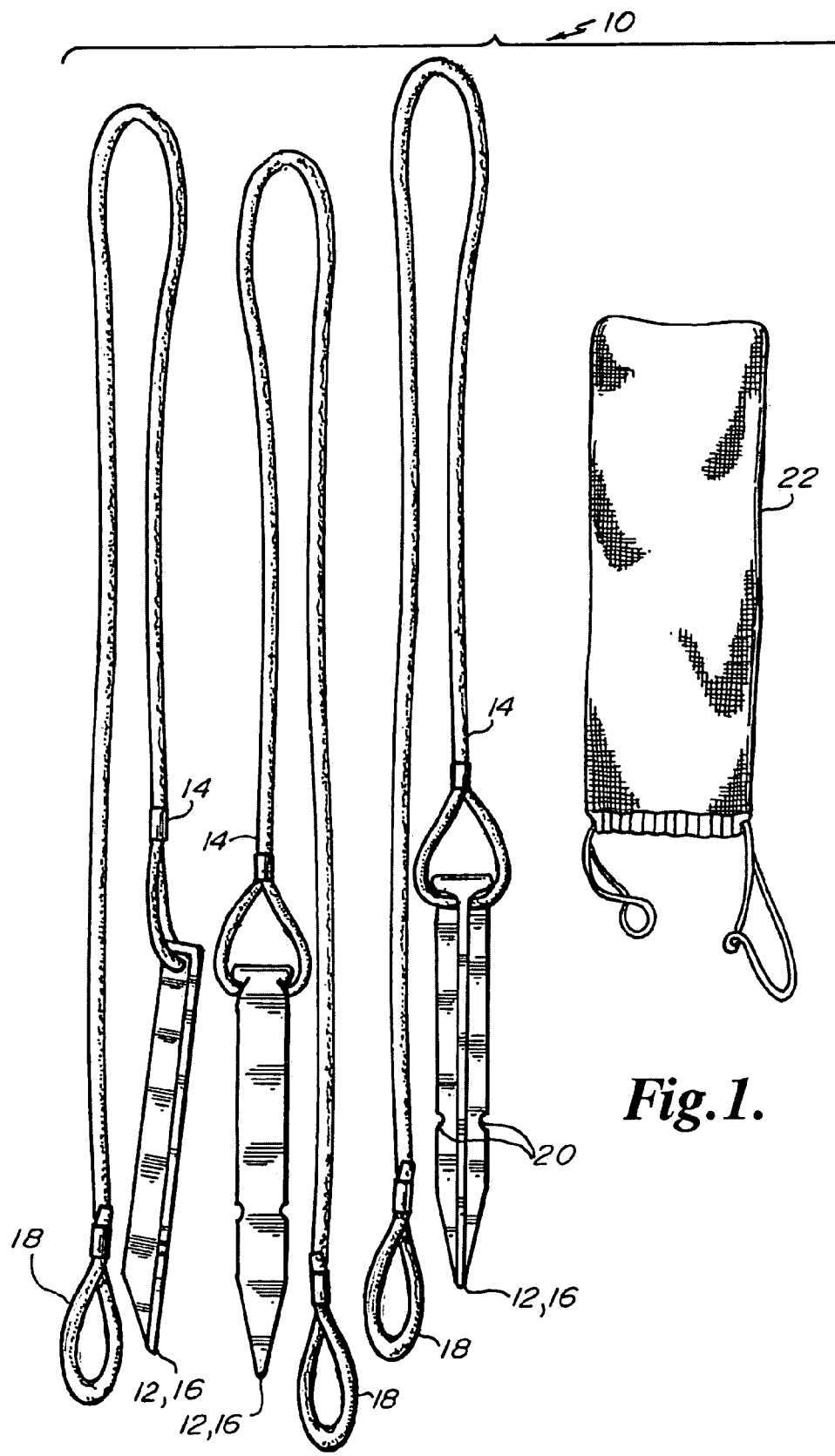
FIG. 1 is a view of the components of the present invention.

A preferred embodiment of the present invention is shown in the Figures as reference numeral 10.

As seen in FIG. 1, the big game field dressing kit 10 comprises a plurality of hold-downs 12 and a plurality of flexible ties 14 attached to the plurality of hold-downs 12. Most preferably the hold-downs 12 are pointed stakes 16. The plurality of ties each has a loop 18 at an end distal from the stakes 16. At least one of the stakes 16 has notches 20. The ties 16 can be ropes, cables, or any other suitably flexible item. The kit 10 may also comprise a sack 22 for holding the stakes and ties.

Figure 2:
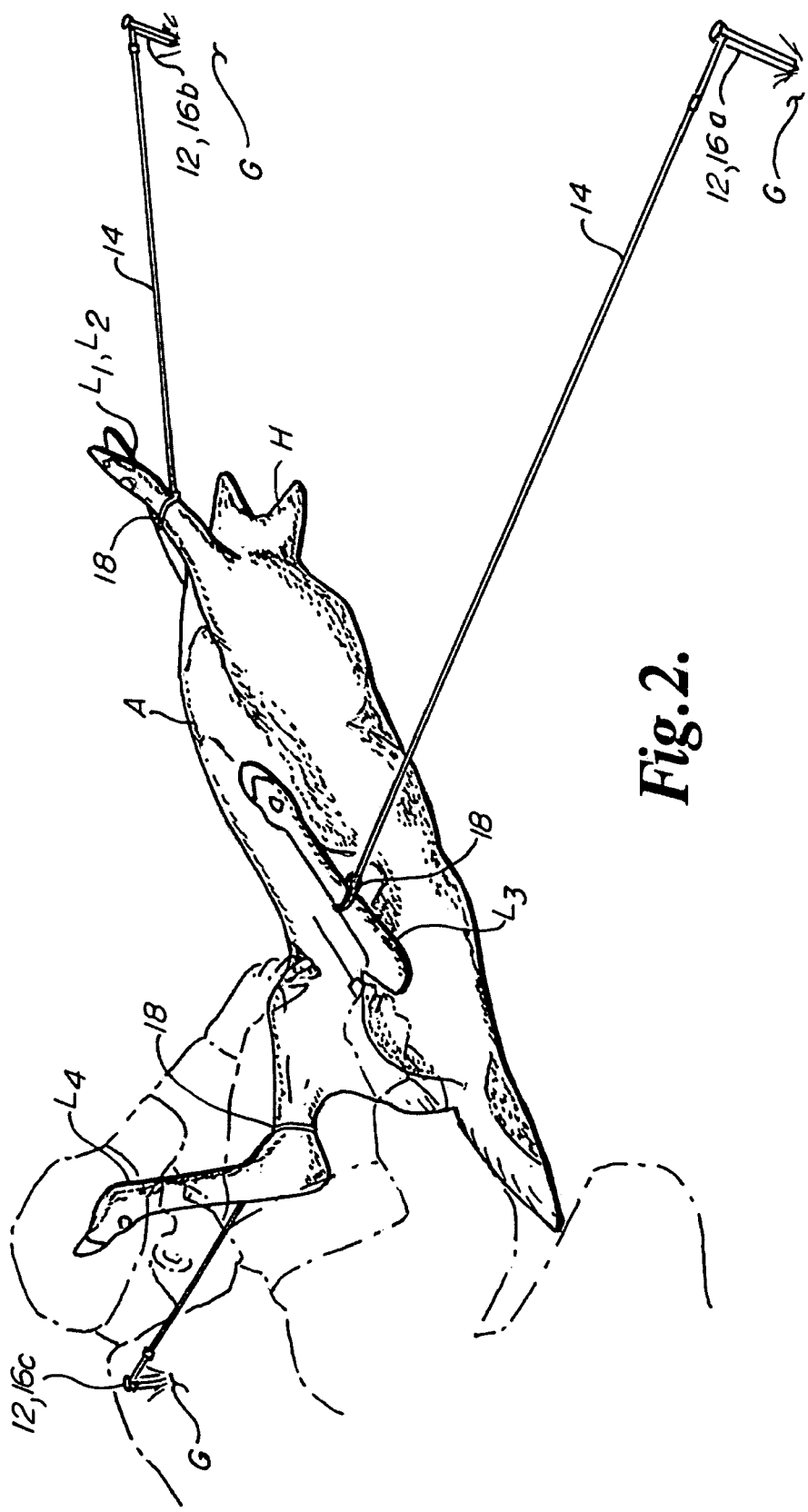
FIG. 2 is a perspective view showing the present invention used for field-dressing.

Turning to FIG. 2, it can be seen that each of the plurality of hold-downs 12 or stakes 16 can be driven into the ground G at various points around the animal A. The plurality of flexible ties 14 are then attached to the animal A using the loops 18 in such a manner as to tension the animal A for field dressing. As can be seen, the tensioning of the animal A allows a single person (shown in phantom) to field dress the animal A.

In the preferred embodiment, there are three stakes 16a, 16b, 16c. The stakes are driven into the ground G adjacent the animal's head H and each leg L. One of the plurality of stakes, shown here as 16b, holds the animal's front legs L1, L2 and the other two stakes 16a, 16c hold the animal's rear legs L3, L4.

Figure 3:
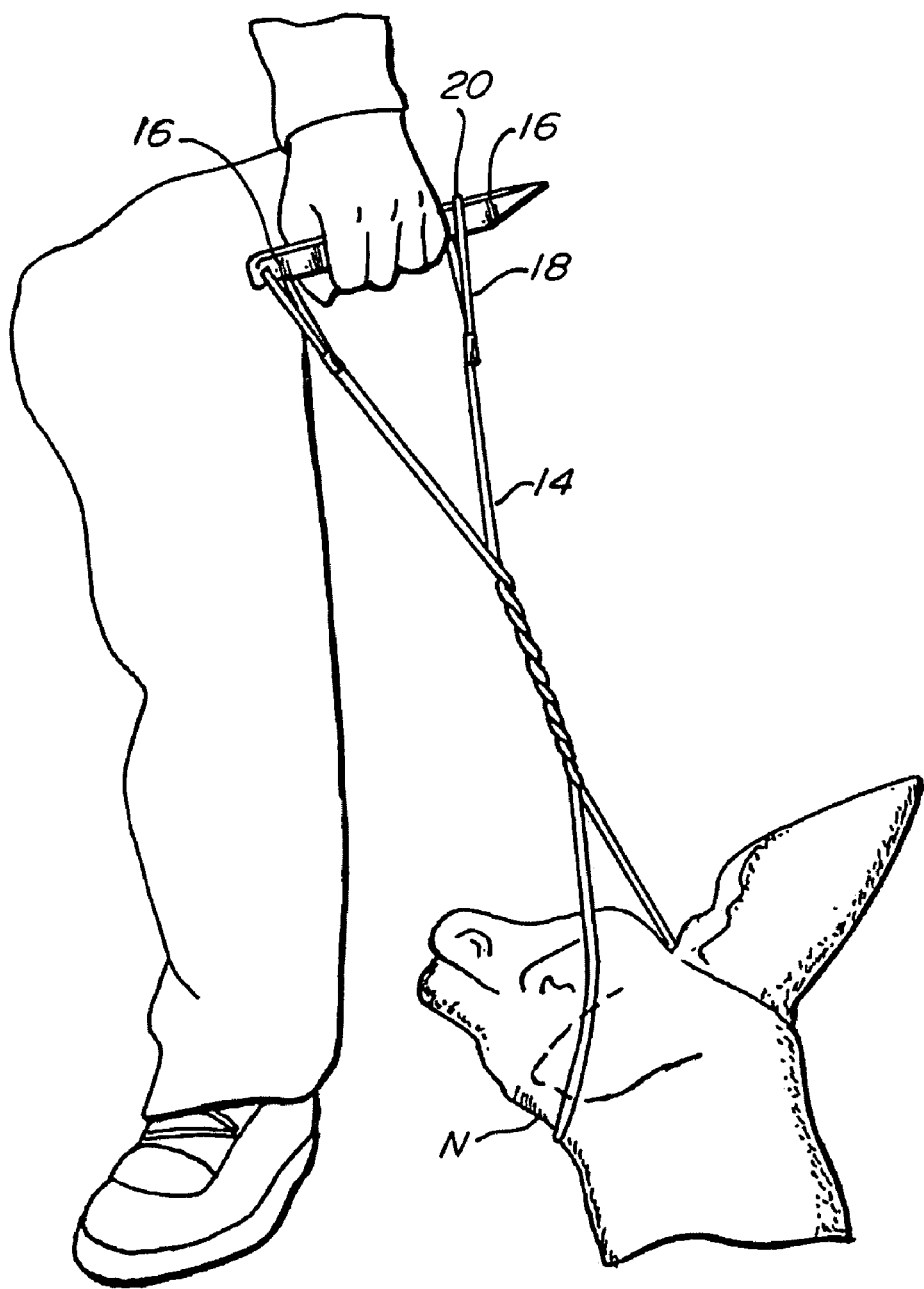
FIG. 3 is a perspective view showing the present invention used for dragging the animal.

Once the animal has been field-dressed, the kit of the present invention can be used as an aid in transporting the animal to another location, for example, to a vehicle (not shown). FIG. 3 illustrates this aspect of the present invention.

As seen in FIG. 3, a flexible tie 14 is passed around the animal's neck N. The loop 18 is then inserted into the notches 20 of the stake 16. The stake 16 then can be used as a handle to drag the animal. Suitably, the flexible tie 14 can be twisted about itself as shown in the Figure to make the connection to the animal's neck secure.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A big game field dressing kit for field dressing a game animal on the ground and transporting the game animal, comprising:

(a) a plurality of pointed stakes adapted to be driven into the ground; and (b) a plurality of flexible ties attached at a first end to a corresponding stake of the plurality of stakes and adapted to be affixed to the game animal thereby tensioning the carcass of the game animal for field-dressing;

(c) wherein each of the plurality of flexible ties further comprises a loop at an end distal from the corresponding stake, wherein the loop is attachable to one of the animal's limbs;

(d) wherein at least one of the plurality of stakes has a notch separate from the attachment point of the first end of the flexible tie for receiving the loop after the tie is passed around the animal's neck, thereby allowing the animal to be dragged to another location.

2. The kit of claim 1, further comprising a sack holding the plurality of stakes and ties.

3. The kit of claim 1, wherein the plurality of stakes comprises three stakes adapted to be driven into the ground adjacent the animal's head and each leg and wherein one of the plurality of ties is adapted to hold the animal's front legs and the other two ties are adapted to hold the animal's rear legs.

4. A big game field dressing kit for field dressing a game animal on the ground and transporting the game animal, comprising:
   (a) a plurality of pointed stakes adapted to be driven into the ground; and
   (b) a plurality of flexible ties having a first end attached to a first attachment point on a corresponding stake of the plurality of stakes and adapted to be affixed to the game animal thereby tensioning the carcass of the game animal for field-dressing;
   (c) wherein each of the plurality of flexible ties further comprises a loop at a second end distal from the corresponding stake, wherein the loop is attachable to one of the animal's limbs; and
   (d) at least one of the plurality of stakes has a second attachment point for attaching the loop, spaced from the first attachment point and forming a handle therebetween, thereby allowing the animal to be dragged to another location.

\* \* \* \* \*